(12) United States Patent
Phillips et al.

(10) Patent No.: US 7,668,938 B1
(45) Date of Patent: Feb. 23, 2010

(54) METHOD AND SYSTEM FOR DYNAMICALLY PURPOSING A COMPUTING DEVICE

(75) Inventors: Thomas G. Phillips, Bellevue, WA (US); Kartik N. Raghavan, Seattle, WA (US); Ryan W. J. Waite, Seattle, WA (US); Paul C. Sutton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 09/713,740

(22) Filed: Nov. 15, 2000

Related U.S. Application Data

(60) Provisional application No. 60/176,231, filed on Jan. 14, 2000.

(51) Int. Cl.
*G06F 15/177* (2006.01)
*G06F 15/173* (2006.01)

(52) U.S. Cl. ............... 709/220; 709/221; 709/223; 717/168; 717/174

(58) Field of Classification Search ......... 709/202–203, 709/223–224, 235, 238–239, 220–221; 717/168, 717/171–172, 174, 176
See application file for complete search history.

(56) References Cited

U.S. PATENT DOCUMENTS

| | | | | |
|---|---|---|---|---|
| 5,136,711 | A | * | 8/1992 | Hugard et al. ............. 713/2 |
| 5,155,837 | A | * | 10/1992 | Liu et al. .................. 709/221 |
| 5,410,699 | A | | 4/1995 | Bealkowski et al. |
| 5,432,927 | A | * | 7/1995 | Grote et al. ............... 713/2 |
| 5,454,110 | A | * | 9/1995 | Kannan et al. ............ 713/2 |
| 5,684,952 | A | * | 11/1997 | Stein ....................... 709/221 |
| 5,692,190 | A | | 11/1997 | Williams |
| 5,708,776 | A | * | 1/1998 | Kikinis ..................... 714/55 |
| 5,752,042 | A | * | 5/1998 | Cole et al. ................ 709/219 |
| 5,787,491 | A | | 7/1998 | Merkin et al. |
| 5,802,363 | A | * | 9/1998 | Williams et al. ............ 713/2 |

(Continued)

FOREIGN PATENT DOCUMENTS

EP      0 917 060 A1    5/1999

(Continued)

OTHER PUBLICATIONS

Chakraborty, D. "Survivable Communication Concept Via Multiple Low Earth-Orbiting Satellites". IEEE Transactions on Aerospace and Electronic Systems, vol. 25, No. 6, 879-889. Nov. 1989.*

(Continued)

*Primary Examiner*—Rupal D Dharia
*Assistant Examiner*—Jeffrey R Swearingen

(57) ABSTRACT

A system and method for purposing a computing device is disclosed. A management controller system is used to copy a system image from a library of system images to a target partition of the computer to be repurposed. The system image may include a configured copy of an operating system and an application program. The system image may also include logic for generating and assigning a unique security identifier to the computer. The invention includes a managed node service for monitoring the status of the computer and for performing some of the necessary steps in purposing the computer. Additionally, the invention includes facilities for loading a default operating system on the computer when the computer is first connected to a network.

25 Claims, 5 Drawing Sheets

U.S. PATENT DOCUMENTS

| | | | |
|---|---|---|---|
| 5,848,241 A * | 12/1998 | Misinai et al. | 709/213 |
| 5,887,163 A * | 3/1999 | Nguyen et al. | 713/2 |
| 5,991,542 A * | 11/1999 | Han et al. | 717/167 |
| 6,098,158 A | 8/2000 | Lay et al. | |
| 6,158,002 A | 12/2000 | Kwan et al. | |
| 6,170,055 B1 | 1/2001 | Meyer et al. | |
| 6,247,109 B1 * | 6/2001 | Kleinsorge et al. | 712/13 |
| 6,289,449 B1 | 9/2001 | Aguilar et al. | |
| 6,300,863 B1 * | 10/2001 | Cotichini et al. | 340/5.8 |
| 6,304,965 B1 | 10/2001 | Rickey | |
| 6,308,264 B1 * | 10/2001 | Rickey | 713/2 |
| 6,308,265 B1 | 10/2001 | Miller | |
| 6,317,826 B1 * | 11/2001 | McCall et al. | 713/1 |
| 6,347,371 B1 * | 2/2002 | Beelitz et al. | 713/2 |
| 6,381,694 B1 | 4/2002 | Yen | |
| 6,438,688 B1 * | 8/2002 | Nunn | 709/220 |
| 6,449,716 B1 * | 9/2002 | Rickey | 713/2 |
| 6,535,977 B1 * | 3/2003 | Holle et al. | 713/2 |
| 6,557,169 B1 * | 4/2003 | Erpeldinger | 717/173 |
| 6,560,701 B1 * | 5/2003 | Berstis et al. | 713/2 |
| 6,578,068 B1 * | 6/2003 | Bowman-Amuah | 709/203 |
| 6,591,376 B1 * | 7/2003 | VanRooven et al. | 714/36 |
| 6,647,408 B1 * | 11/2003 | Ricart et al. | 718/105 |
| 6,658,563 B1 | 12/2003 | Ice, Jr. et al. | |
| 2002/0091805 A1 | 7/2002 | Phillips et al. | |

FOREIGN PATENT DOCUMENTS

| | | |
|---|---|---|
| WO | WO 95/22794 | 8/1995 |

OTHER PUBLICATIONS

Chakraborty, D. "Survivable Communication Concept Via Multiple Low Earth-Orbiting Satellites". IEEE Transactions on Aerospace and Electronic Systems, vol. 25, No. 6, 875-889. Nov. 1989.*

Stevens et al., "El Torito ": *Bootable CD-ROM Format Specification Version 1.0*, Phoenix Technologies and IBM, pp. 1-20 (1994).

Lawson, M., et al., "Reconfiguration Techniques of a Mobile Network", in *Proceedings of the 1980 International Zurich Seminar on Digital Communications*, IEEE Catalog No. 80CH1521-4, pp. B10.1-B 10.4 (Mar. 1980).

Burns, A., et al., "Dynamic Change Management and Ada", *Journal of Software Maintenance: Research and Practice*, vol. 1, No. 2, pp. 121-131 (Dec. 1989).

Banker, R., et al., "A Field Study of Scale Economies in Software Maintenance", *Management Science*, vol. 43, No. 12, pp. 1709-1725 (Dec. 1997).

\* cited by examiner

METHOD AND SYSTEM FOR DYNAMICALLY PURPOSING A COMPUTING DEVICE

RELATED APPLICATIONS

This application claims priority from U.S. provisional application Ser. No. 60/176,231 filed on Jan. 14, 2000, entitled "Dynamic Server Re-purposing (DSRP)."

TECHNICAL FIELD

This invention relates generally to purposing of computing devices and, more particularly, relates to a method and system for dynamically purposing computing devices.

BACKGROUND OF THE INVENTION

Typically a computing device is capable of serving one or more purposes defined by the operating system used by the computing device and one or more application programs that are installed on the computing device. To purpose a computing device, a user typically has to sequentially and manually install an operating system, install one or more application programs, and configure the operating system and application program to work with each other. Additionally, in some but not all operating system environments, such as the WINDOWS® NT and WINDOWS® 2000 operating system environments, when the computing device is added as a node in a secure network environment, the user has to ensure that a unique security identifier is properly generated and assigned to the computing device. This process can be very time consuming depending on the complexity of the operating system and application program in question, and more typically requires complex scripts and custom development. Moreover, it is not uncommon in a corporate or commercial setting that this process has to be repeated for hundreds or thousands of computing devices.

One situation in which there is a need to purpose hundreds or thousands of computing devices is an Internet Service Provider (ISP) or Application Service Provider (ASP). As one example, an ISP may have contracts with hundreds or thousands of customers to design, implement and/or operate the clients' web sites. For each customer, the ISP will purpose one or more web servers to provide the client's web site needs. Each customer, however, is likely to have varying amounts of traffic to its web site, depending on numerous factors including the time of year, or special occasions or events. Each customer needs to be assigned a sufficient number of servers to cope with reasonably expected peak traffic to the web site, although it is unlikely that every customer will experience peak traffic to its web site at the same time.

This arrangement is expensive for both the customer and the ISP because, except during periods of peak use, the computing devices are likely to be underutilized. Thus, the ISP has to maintain computing devices that are underutilized most of the time. Similarly, the customer has to pay for computing devices that are not efficiently used at all times. Because repurposing a computing device is such a difficult and time consuming procedure, once a computing device is purposed for a particular customer the ISP is unlikely to repurpose the computing device during periods when it is underutilized. It is difficult, therefore, for an ISP to reallocate computing devices based on a customer's current computing needs.

The time consuming nature of purposing computing devices is also troublesome to an ISP when a particular computing device experiences a failure or error. For example, if the computing device has to be replaced, the ISP has to manually install an operating system, an application program and configure a new computing device to replace the one that failed. This process may take hours to complete, and in the meantime a customer web site may experience problems such as being completely down, being unduly slow, losing sales, etc.

Another situation in which there is a need to purpose hundreds or thousands of computers is when, for example, a large corporation purchases many computing devices and needs to purpose those computers for its employees. Every computer will have to be individually configured after manually installing an operating system and any desired application programs. There are methods to somewhat automate this process by "burning" the system image on the hard drives of the computers in an assembly line fashion. The process is still onerous and time consuming however, because the hard drives will have to be physically removed and reinserted into the computers.

SUMMARY OF THE INVENTION

The method and system of the present invention allows for dynamically purposing a computing device, such as a general-purpose desktop computer or a server, that is added to a network environment. Dynamically purposing (or repurposing) a computing device is referred herein as purposing (or repurposing) a computing device without the need of manually and/or sequentially installing and configuring an operating system and one or more application programs. Therefore, when a computing device is dynamically purposed (or repurposed), a system image, which may be comprised of an already configured operating system and/or one or more application programs, is transferred to a computer within a single process. Following this transfer, the computer can be restarted, resulting in a computing node that is now repurposed for a new computing role. This transfer is facilitated by using a preconfigured system image, which may consist of one or more operating systems and/or one or more application programs, which may be selected from a library of system images that are awaiting installation on a new or existing computing device on the network. Consequently, the present invention eliminates the need to manually and/or sequentially install and configure an operating system and one or more application programs on each computer added to the network. Additionally, the invention allows for the dynamic repurposing of computers that already are a part of the network.

For large computing customers, this invention means that computing nodes can be repurposed on an ongoing basis. As a result, the total number of computing devices necessary to meet the expected load capacity is greatly reduced. For example, in a typical ISP center, the number of computing devices is reduced from the number of devices necessary to accommodate the maximum load on every site at the same time, to the number of devices necessary to accommodate the typical load on every site. This can be exemplified in the following manner:

An ISP that hosts 100 varied sites deploys 1150 computers. This figure is based on the maximum load of the following customer sets:

25 sites with 4 machines per site=100 (max load 4, average load 1)

50 sites with 6 machines per site=300 (max load 6, average load 2)

25 sites with 30 machines per site=750 (max load 30, average load 10)

Using this invention, the same ISP could accommodate their customers with a fraction of the computers. Instead of purchasing 1150 computers, the ISP can instead purchase, for example, approximately 400 computers, which includes a buffer for absorbing load increases. As an end result, the invention reduces the ISP operating costs, simplifies the management of the site, and enables capacity beyond what would have previously been obtained with 400 computers.

The invention uses a library of preconfigured system images which may be comprised of one or more operating systems and/or one or more application programs. A controller monitors all the computers on the network and repurposes any computers as desired. The controller is responsible for managing and controlling a repurposing operation, which includes transfer of a selected system image from the library of system images to a designated computer. An image transfer engine is used to transfer the system image from the library of images to the designated computer. The image transfer engine may perform, for example, a copy operation.

The invention also may use a facility for remotely installing a default operating system on computers that are connected to the network. Included in the initial default operating system installation is a service for managing the computing device as a node on the network.

In one embodiment, a repurposable computer connected to the network has a hard disk with a Master Boot Record, a default partition, a target partition, and a recovery partition. The default partition includes a copy of the default operating system that is installed on the hard disk when the computer is first connected to the network, for example, through a LAN. The hard disk also includes a target partition for receiving a system image from the library of system images. Once the system image is installed on the target partition, the computer boots from the target partition and runs the operating system and/or application program on the target partition.

In accordance with the invention, instead of staffing computer processing requirements for a peak level, one can add or remove computing capacity from a pool of available resources. Thus, the invention can be used to repurpose computers within a data center or network to meet capacity, load or customer requirements. The invention also enables quick and efficient recovery from a failure. If a computer fails, a new repurposable computing device can quickly be installed with a system image to run the same operating system and application program as the computer that failed.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
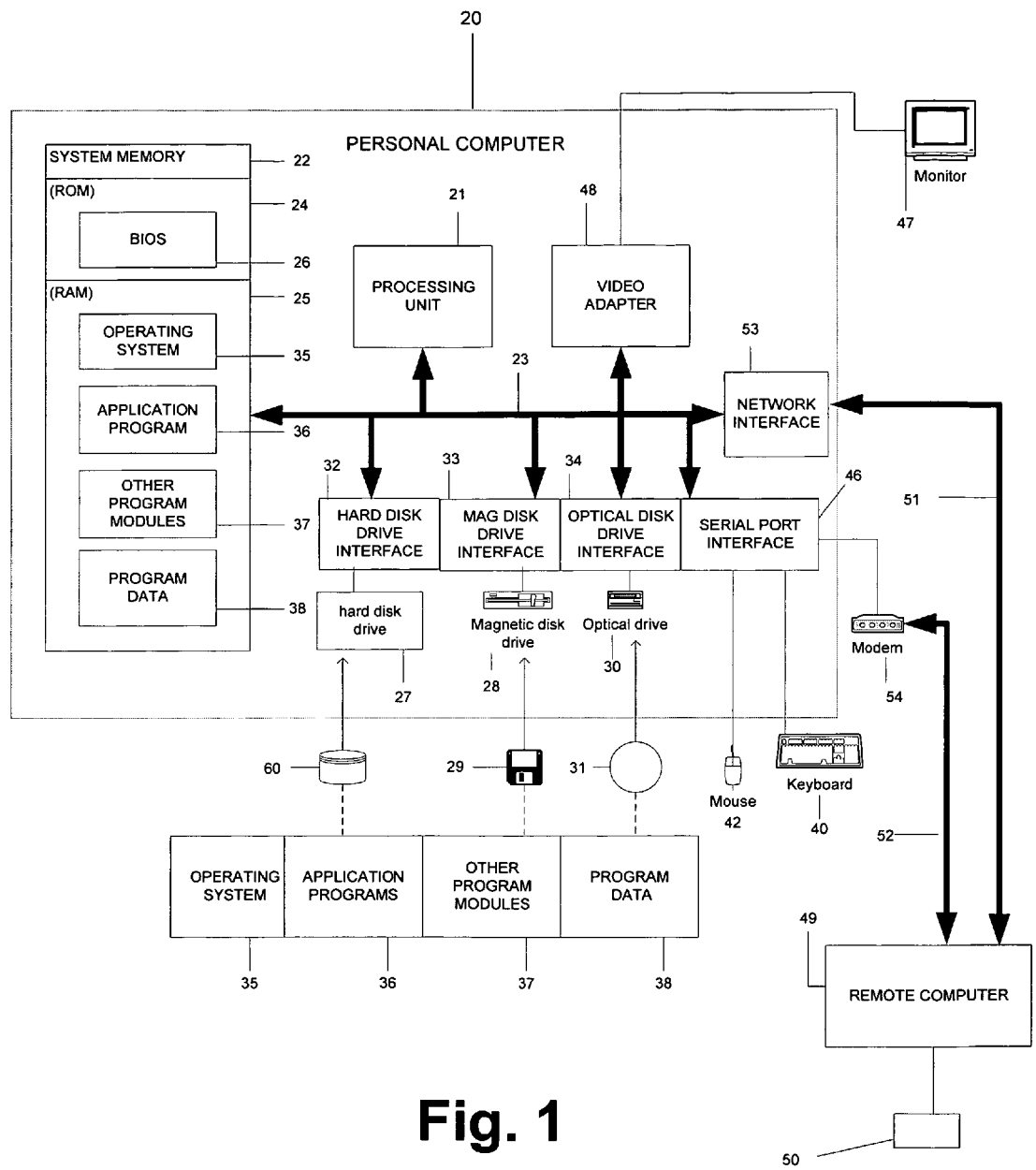
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
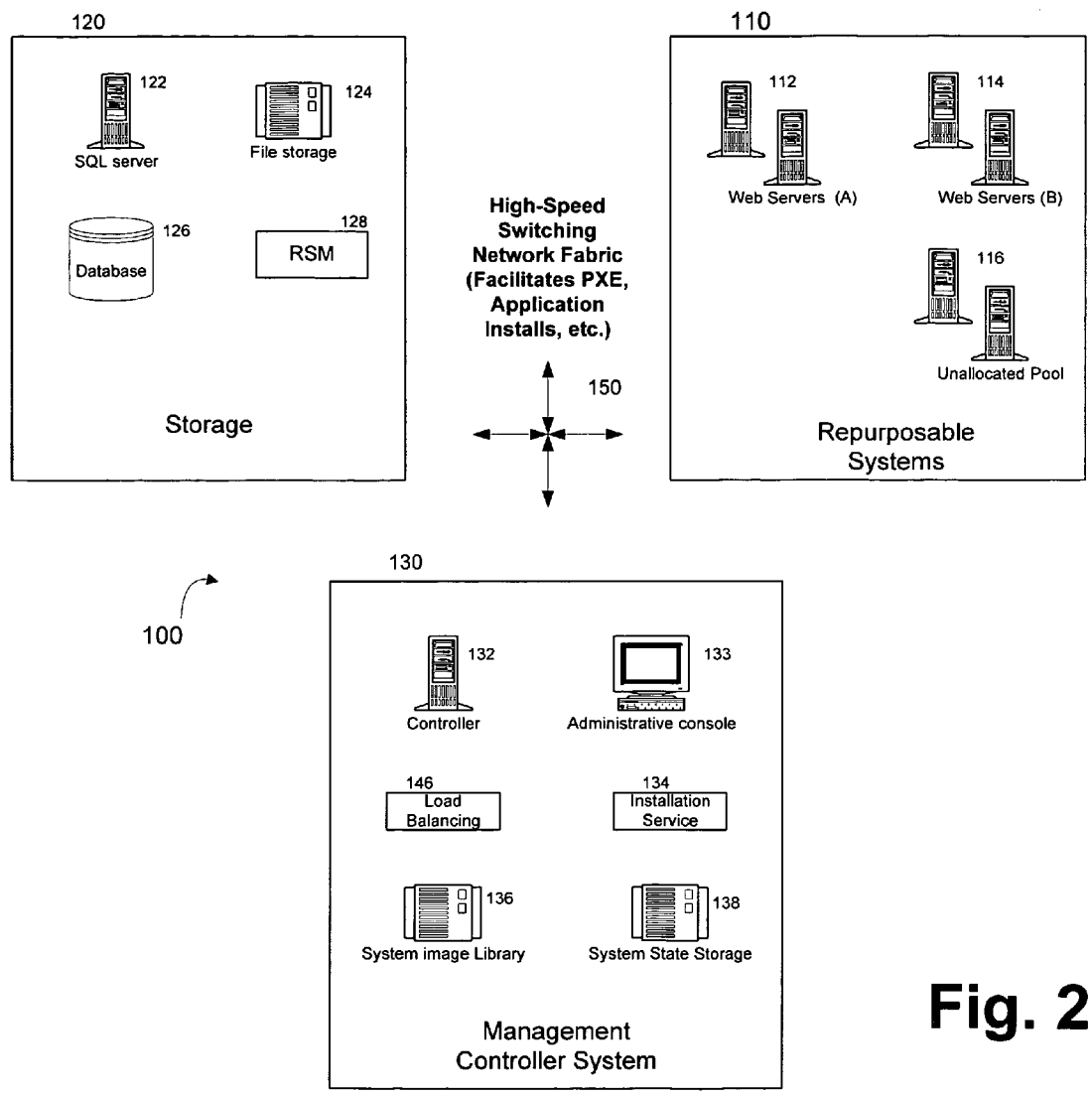
FIG. 2 is a block diagram of an implementation of the invention in a typical network environment.

FIG. 2 is a block diagram of a typical network 100 found in an ISP data center that may use the method and system of the present invention. The figure is intended to depict the operational relationship of the various components of the network and not the actual physical layout. The invention, however, is not limited to a network in an ISP data center and is applicable to any networked environment.

The network 100 is comprised of one or more repurposable computers 110, one or more storage devices 120, and a management controller system 130, all of which are connected through a LAN 51. The LAN 51 may more specifically be comprised of a high-speed switching network fabric 150 that can facilitate the Portable (or Pre-Boot) eXecution Environment (PXE) and remote operating system and application installs.

In this typical ISP data center, each of the repurposable computers 110 may be installed with a different operating system and application program to provide the services desired by the ISP's customers. For example, one or more computers 112 may be installed with an operating system and application program to act as a web server for customer A, while a different group of one or more computers 114 may be installed with an operating system and application program to act as a web server for customer B. The one or more repurposable computers 110 also may include an unallocated pool of one or more computers 116 that can be purposed for any given task when desired or needed. Each one of the repurposable computers 110 may be considered as a separate node in the secure network that comprises the ISP data center.

In a typical ISP data center network, the one or more repurposable computers 110 generally contain and provide high level information in various formats such as, for example, Hyper Text Markup Language (HTML) or Active Server Pages (ASP). The repurposable computers 10 in turn may access and utilize more detailed information stored in the collection of storage devices 120 through the high speed switching network fabric 150. The collection of storage devices 120 may include any number or type of devices necessary to support the operation of the repurposable computers 110. By way of example and not limitation, the collection of storage devices 120 may include one or more SQL servers 122, one or more file storage devices 124, one or more data bases 126, and one or more remote storage management services 128. The collection of storage devices 120 are accessible to the group of repurposable computers 10, but not to computers that are not part of the secure network realm that comprise the ISP data center 100. For example, if one of the web servers 112 is accessed and requested to provide detailed product specifications, the web server 112 may query the SQL server 122 to obtain and provide the requested information.

The network 100 also includes a management controller system 130 for monitoring and managing the repurposing of nodes that are a part of the network 100, including each of the one or more repurposable computers 110. The management controller system 130 is comprised of, for example, a controller 132, an administrative console 133, an installation service 134, a library of system images 136, a system state storage 138, and a load balancing module 146.

Figure 3:
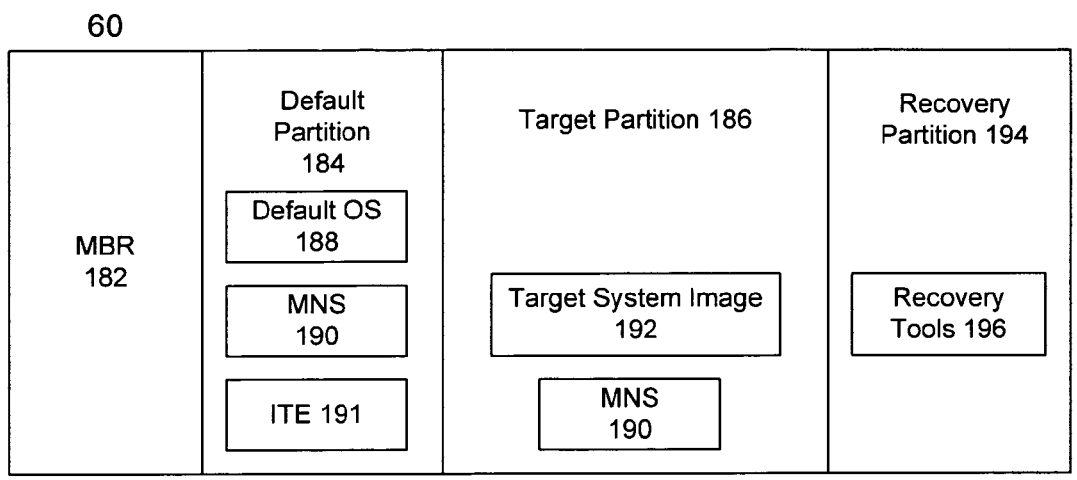
FIG. 3 is a schematic diagram of the hard disk on a repurposable computer.

FIG. 3 is a schematic diagram of a representative hard disk 60 of the one or more repurposable computers 110, or any other device which may be a node on the network 100. The hard disk 60 includes a Master Boot Record (MBR) 182 and several partitions. The MBR generally includes a map of the hard disk, including the location of the partitions and information with respect to which partition is the active partition. The default partition 184 includes a copy of a default operating system 188, the Managed Node Service (MNS) 190, and any necessary image transfer engine program modules 191 to perform a system image transfer from the library of system images 136 to the target partition 186. Alternatively, the image transfer engine program modules 191 may reside on any partition of the hard disk 60 so long as a system image can successfully be transferred to the target partition 186. The target partition 186 may include a copy of the MNS 190 and a target system image 192. The target system image 192 includes the preconfigured operating system and/or application program(s) that defines the purpose of the computer. The hard drive 60 may also, but is not required to, include an additional partition 194 that includes Recovery tools 196 that may be used in the event that the computer experiences an error or failure.

Moreover, the hard disk 60 may have more than one target partition 186. In such an arrangement, different target system images 192 may be stored on each target partition, and the computer may be repurposed by changing the target partition from which the computer boots. This arrangement may be useful, for example, if the sequence of repurposings is known in advance.

Referring back to FIG. 2, a library of system images 136 is available for selecting and installing a target system image 192 on any one of the repurposable computers 10. The library may be stored on any suitable device that can be accessed and searched to retrieve a system image, e.g., a file server, a data base, a hard disk, ROM, RAM, etc. An advantage of the present invention is that each system image in the library of system images 136 may include a preconfigured copy of an operating system and one or more application programs that enable a computer to serve a particular purpose, i.e., to perform a particular task, role or function. Each of the system images in the library 136 may include one or more program modules that allow a unique security identifier to be generated when the system image is loaded on one of the repurposable computers 10 to enable the computer to be registered as a trusted node on the secure network 100. The method and system for creating such system images is fully explained in currently pending patent application Ser. No. 09/410,197, entitled "System and Method for Regenerating and Reapplying a Unique Identifier for a Computer System," the entirety of which is hereby incorporated by reference.

Briefly, a computer with an existing operating system and application program is configured to execute a startup program on the next boot sequence. The image on the hard drive of the computer is duplicated to the library of system images 136 and is available for loading on the target partition 186 of any of the repurposable computers 110. The startup program includes a security identification changer sequence and a setup wizard component. When a system image is transferred from the library of system images 136 to the target partition 186 of a repurposable computer and the target partition is booted, the startup program completes necessary system configuration and any tasks required to make the repurposable computer unique. Making the repurposable computer unique may include generating a new, unique security identifier for the repurposable computer.

Those with ordinary skill in the art are aware of many different methods and/or protocols for implementing security identifiers depending on the network and/or operating system (e.g., SIDs in the WINDOWS® 2000 operating system). The term security identifier is herein used generically and encompasses any implementation that allows a computing device to be registered as a trusted node on a secure network environment.

Although the system images in the library 136, or those that are loaded on the hard disk 60, may include a preconfigured copy of both an operating system and an application program, the invention is not so limited. For example, the system images in the library 136 or on the hard disk 60 may be comprised of only an operating system(s), or only an application program(s). As another alternative, the system images in the library 136 may be files that include only the changes that must be made to an existing system image 192 on the target partition 186 to repurpose the computer. Thus, instead of overwriting an existing system image on the target partition with a new system image that contains a complete, preconfigured operating system and application program, the invention may write to the target partition 186 one or more files that contain the necessary changes to the existing system image 192 on the target partition 186 to repurpose the computer.

The controller 132 monitors the status of each of the nodes on the network and can repurpose any of the repurposable computers 110. The controller 132 monitors and repurposes the repurposable computers 110 through the managed node service (MNS) 190 that is installed on each of the repurposable computers 110. The MNS periodically sends a status report to the controller 132 updating the controller 132 as to the purpose and status of the repurposable computer, e.g., whether the computer is running from the default partition or the target partition, which system image if any is running on the target partition, whether the computer is scheduled to be repurposed, etc. This information is then stored on the system state storage 138.

FIG. 3 shows that the MNS 190 is located on both the default partition 184 and the target partition 186. This is because the MNS is always running on each of the repurposable computers 110, regardless of the partition from which the repurposable computer is running. When the repurposable computer is running the operating system on the default partitions the MNS on the default partition is used to communicate and interact with the controller 132. Alternatively, when the repurposable computer is running the target system image 192 on the target partition 186, the MNS on the target partition is used to interact and communicate with the controller 132.

When the controller 132 performs a repurposing operation on one of the repurposable computers 110, the MNS program module 190 is responsible for the receiving side of the system image transfer to the computer. Specifically, the MNS completes the system image transfer on to the target partition of the hard drive 60 of the repurposable computer 110 and, if the transfer is successful, changes the master boot record 182 to cause the next machine boot process to occur from the target partition 186.

A repurposing operation may be initiated by a user through the administrative console 133, or by an automated process such as a load balancing program 146, an algorithm or a heuristic (not shown). The load balancing program 146 may reside on a dedicated load balancing server, the controller 132, or any other suitable location or device on the network 100. If, for example, the web servers 112 purposed for customer A experience an increase in traffic, while the web servers 114 purposed for customer B experience a decrease in traffic, a user or load balancing program 146 may initiate a repurposing procedure to repurpose one or more of the servers 114 to customer A's web server. The repurposing is accomplished by installing on the selected servers 114 a system image from the library of system images 136 that includes a preconfigured operating system and/or application program that makes the server function as a web server for customer A. The actual transfer of the system image is accomplished through an image transfer engine 191 on the default partition 184 of the repurposable computer. The image transfer engine 191 performs a binary image transfer (e.g., copy) of the selected system image from the system image library 136 to the target partition 186 of the hard disk 60 of the repurposable computers 110.

As part of the system image transfer, the system also installs a copy of the MNS 190 on to the target partition 186. This task can be accomplished in a variety of ways. For example, the images in the system image library 136 may include a copy of the MNS. The MNS is then copied and installed on the target partition 186 as part of the system image transfer. Alternatively, the MNS may be copied on the target partition from the default partition 184 or from another location by appropriate program module(s) or routine(s).

Initiating a purposing or repurposing operation is not limited to a load balancing program or a user. Indeed, any automated process, prompt, or manual process may be used to initiate a repurposing operation. For example, the controller 132 may automatically initiate a repurposing at a predesignated time of day, week, month or year. As another example, the controller 132 may use a heuristic or a predictive algorithm to initiate a purposing or repurposing operation. Moreover, instead of repurposing one or more of the servers 114 as web servers for customer A, the user or load balancing program may purpose one or more of the computers from the unallocated pool of computers 116 to function as web servers for customer A.

Through the administrative console 133, a user may have complete operational control over the controller 132. By way of example, and not limitation, a user may be able to monitor the status of each node on the network, the purpose of each node on the network, the load on each node on the network, etc. The administrative console 133 also allows the user to initiate and monitor purposing or repurposing operations. For example, the user may select a system image from the library 136 and direct that the system image be installed on a particular one of the repurposable computers 110. Those with skill in the art will recognize that a user interface on the administrative console may have any appropriate or desired look and feel. Moreover, an administrative console is not strictly necessary to the invention because the monitoring and repurposing operations may be entirely automated without any user intervention.

Figure 4:
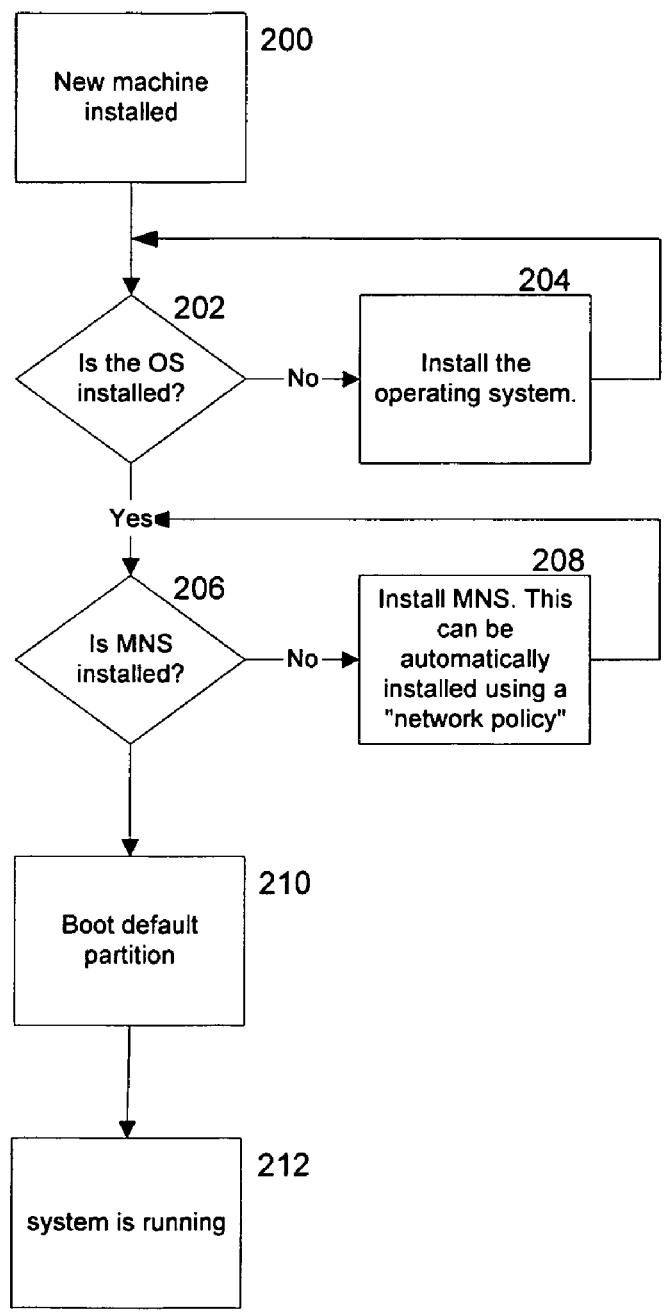
FIG. 4 is a flowchart of the steps performed to purpose a new computer added to the network.

Referring to FIG. 4, there is shown a flowchart of the steps that are performed when a new node (e.g., one of the repurposable computers 110) is added to the network 100 shown in FIG. 2. For ease of reference, it is assumed that one of the unallocated pool of repurposable computers 116 is being added to the network 100 for the first time. At step 200 the computer 116 is connected to the network 100 through the network interface 53. The network interface may be, for example, a network adapter controller. The network interface 53 preferably incorporates facilities for automatically assigning the computer 116 a network identifier address. This function may be performed through alternative means, for example, a PROM.

At decision block 202, the invention checks whether a default operating system 188 already exists on the default partition 184 of the hard disk 60 of the computer 116. Such a check can be performed, for example, through an installation service 134. The installation service 134 may reside on a dedicated installation server, the controller 132, or any other suitable location or device on the network 100. The check at step 202 may also be performed by a program on a floppy disk, a CD-ROM, or in the ROM of the server. The installation service 134 allows the computer 116 that is added to the network 100 to find the installation service and remotely install a copy of a default operating system 188 on the default partition 184 of the hard disk 60 of the computer 116. If a default operating system already does not exist on the new computer 116, a copy is installed on the default partition of the computer 116 at step 204 using the installation service 134. Instead of a default operating system, the installation service 134 may install a copy of a default operating system and one or more application programs on the default partition 184.

The default operating system 188 installed on the hard disk 60 of the computer 116 need not be the same for each new computer added to the network 100. The installation service 134 may have the capability to select from different default operating systems to install on the hard disk 60. The particular default operating system that is installed on the new computer 116 may be selected using a network policy or other appropriate means.

An exemplary installation service 134 suitable for use in the present invention is provided in the Remote Installation Services (RIS) facility supported in the WINDOWS® 2000 operating system manufactured by Microsoft Corporation of Redmond, Wash. The RIS facility supported in the WINDOWS™ 2000 operating system uses the Pre-Boot eXecution Environment (PXE) Dynamic Host Configuration Protocol (DHCP)-based remote startup technology to connect to a RIS server and start the installation process. Although the WINDOWS® 2000 operating system provides such an installation service, the invention is not limited to this specific implementation or this specific operating system. Instead, any facility for automatically installing and/or booting an operating system on a new computer added to a network is suitable for use in the present invention.

At step 206 the invention checks whether a copy of the managed node service (MNS) 190 is installed on the default partition 184 of the hard disk 60 of the computer 116. If the MNS 190 is not installed on the computer 116, at step 208 the installation service 134 also installs a copy of the MNS 190 on the default partition 184 of the new computer 116. The MNS 190 initially registers the computer 116 with the controller 132 and communicates the status of the computer 116 to the controller 132 on a regular basis. Additionally, the MNS 190 maintains the computer system 116, including managing the target partition 186 and providing the unique network identification for the computer 116 through the Network Interface Card (NIC) Media Access Control (MAC) identification. The invention may use the MAC ID to identify the computer 116 and the other nodes in the network 100, but is not limited to such an implementation and may use any appropriate identification system or procedure.

Once the default operating system 188 and MNS 190 have been installed on the computer 116, at step 210 the computer 116 boots from the default partition 184 using the default operating system 188. At step 212 the computer is running the default operating system 188 (and perhaps one or more applications) on the default partition 184. The computer 116 will continue running the default operating system 188 on the default partition 184 until the controller 132 performs a repurposing operation and installs a system image selected from the library of system images 136 on the target partition 186 of the hard disk 60 of the computer 116.

Figure 5:
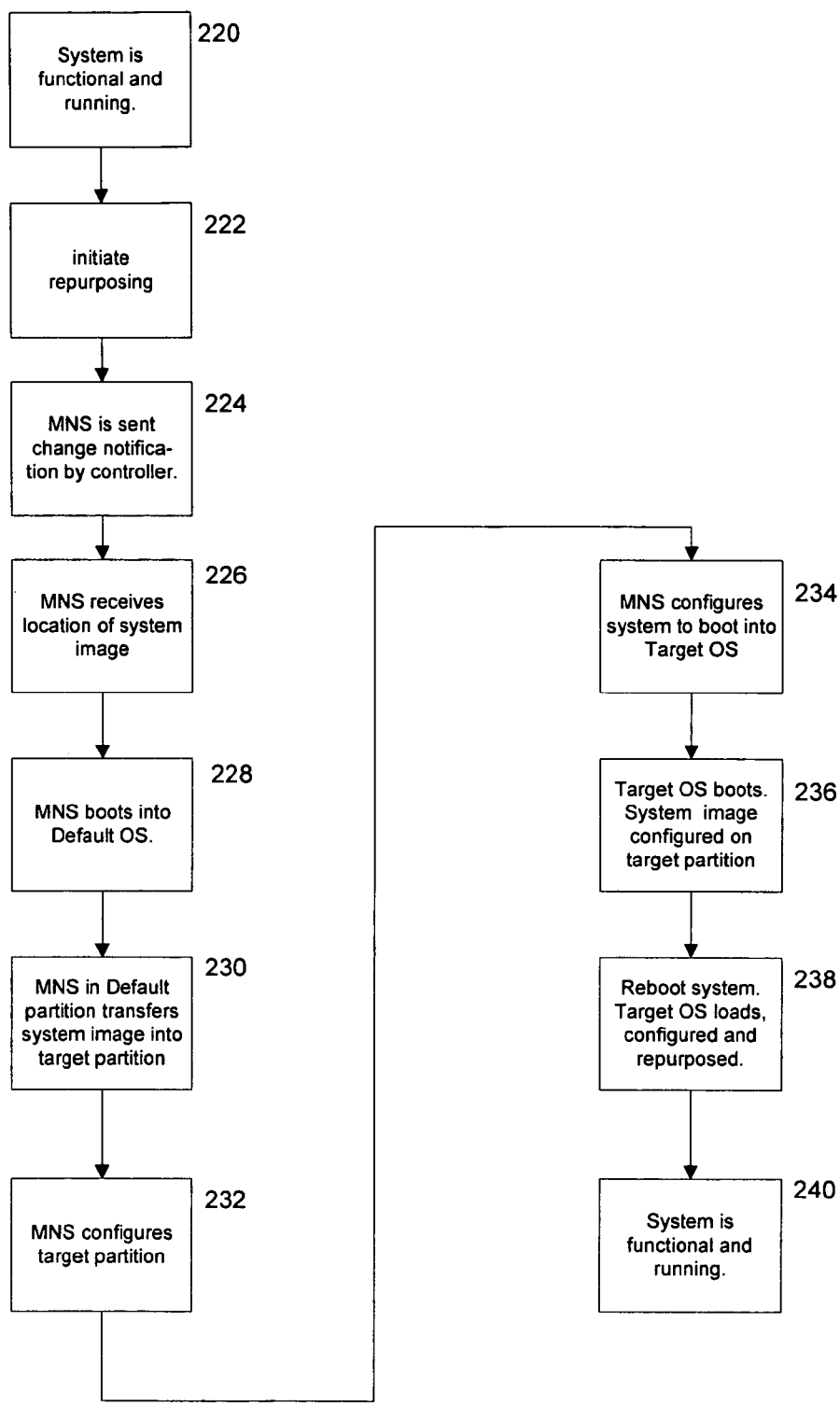
FIG. 5 is a flowchart of the steps performed to repurpose a computer in the network.

FIG. 5 is a flowchart representing the steps that are performed when one of the repurposable computers 110 is to be repurposed (or purposed for the first time). For ease of reference, it is assumed that one of the web servers 112 for customer A is being repurposed as a web server 114 for customer B. The steps described, however, are also applicable for purposing one of the unallocated pool of repurposable computers 116 for the first time. At step 220, the computer system 112 is functioning and running on its target partition 186 the operating system and application program, i.e., target system image 192, that allows it to function as customer A's web server. If the computer system is being purposed for the first time, then at step 220 the computer system is functioning and running the default operating system 188 on its default partition 184. At step 222, a user or automated process initiates a repurposing operation. Next at step 224, the controller 132 sends the MNS 190 a notification that a repurposing operation is to commence. As part of the repurposing operation, the controller 132 sends the MNS 190 on the computer 112 the location that the MNS 190 can find the new system image that is to be installed on the target partition 186 of the computer 112. The MNS receives this location at step 226.

At step 228, the MNS boots the computer system 112 from the default operating system 188 that is installed on the default partition 184. Step 228 is unnecessary if the computer system is being purposed for the first time. Once the computer 112 has booted from the default operating system 188 on the default partition 184, at step 230, the MNS transfers a copy of the selected system image into the target partition 186 using the image transfer engine 191. The selected system image is obtained from the library of system images 136. At step 232 the MNS performs additional configuration functions on the target partition 186 to allow the computer 112 to boot from the target partition 186. As an example, on a computer system running the WINDOWS® NT or the WINDOWS® 2000 operating system, this might be implemented by resetting the boot.ini file appropriately. The MNS may also, for example, remove the existing target partition 186 and recreate the target partition 186 based on the size of the target system image 192 being installed on the hard disk 60. The MNS may receive the information about the size of the target system image from the controller 132 or some other appropriate source. Thereafter, at step 234 the MNS changes the master boot record 52 so that the next time the computer 112 boots, the boot process is conducted from the target partition 186 and new system image 192 installed thereon.

When the computer 112 boots again at step 236, the new system image is automatically setup on the target partition 186 of the computer 112. As part of step 236, a new unique security identifier may be generated and assigned to the computer 112. Once the new target system image 192 is successfully set up on the target partition 186, at step 238, the computer 112 reboots one more time from the target partition 186 to run the operating system and application program. Steps 236 and 238 of this process are described more fully in application Ser. No. 09/410,197, which previously has been fully incorporated by reference. At step 240 the computer 112 has been successfully repurposed as a web server 114 for client B.

Although the invention has been described above with respect to a typical implementation in the network of an ISP data center, the invention is applicable to any computer network regardless of the physical design of the network, the overall purpose of the network or the purpose of each of the individual nodes within the network. A network incorporating the invention need not have any data storage devices 120.

The invention is intended to encompass a network in which any node on the network can be dynamically purposed or repurposed, not merely the repurposable computers 110. By way of example and not limitation, the controller 132 may repurpose one of the SQL servers 122 as a web server 114 for customer B, or vice versa.

Moreover, the invention is not limited to a group of repurposable computers 110 that function as web servers. In fact, the computers 110 may be purposed to perform any logical or computational steps. The purposes served by the group of repurposable computers 110 is particularly broad because any system image comprising of an operating system and perhaps at least one application program can be loaded and run on one of the computers in the group of repurposable computers.

While the management controller system 130 has been depicted as comprising various computing devices, storage devices and program modules, the invention is not limited to the example implementation illustrated in FIG. 2. For example, all of the various components of the management controller system 130 shown in FIG. 2, e.g., controller 132, system image library 136, image transfer engine 144, etc., may be implemented on a single computing device or on multiple computing devices. Moreover, the management controller system 130 is not limited to an implementation on a conventional computer 20 or the like. In fact, one or more of the components comprising the management controller system 130 may be implemented on any device capable of performing the tasks and functions discussed above, e.g., a network interface card, an optical storage medium, a network router, mobile or cellular device, etc. Additionally, the network high speed switching fabric 150 is not limited to a hard wired implementation. Alternatively, for example, the network fabric 150 may be implemented over a wireless or satellite network system as long as the appropriate functionality is achieved.

The invention could also be implemented without a centralized controller 132. Instead, the invention can be implemented using a distributed controller that is installed on every computing node in the network. In such an embodiment, the distributed controller can decide, for example, that additional computing devices need to be purposed to function as web servers 112 for customer A. The distributed controller can then nominate a computing device, which can be any node in the network, e.g., a web server 114 for customer B or an unallocated server 116, to be purposed or repurposed as a web server 114 for customer A. The nominated computing device would then install a copy of the system image of the web server for customer A on its target partition. The nominated computing device will then reboot from the target partition and is now purposed as a web server for customer A.

The invention is also broad enough to allow for the controller 132 to copy system images from a computing device in the network and store them on the system image library 136 for transfer to other computing devices. By way of example and not limitation, suppose a computing device is added to the network 100 containing a system image that does not already exist in the system image library. The controller 132 will then copy the new system image that resides on the computing device and store it in the system image library. The system image will then be available for future transfer to another node in the network.

In addition to dynamically repurposing computing devices in a network, the invention can be used to initially purpose computing devices as they are added to the network. The invention, therefore, eliminates the need to remove a hard disk from the computer, "burn" a system image on the hard disk, and reinstall the hard disk in the computer.

Moreover, the invention allows for easy recovery in the event of a failure or error. If the repurposable computer experiences an error or failure while running the target system image 192 on the target partition 186, the repurposable computer can be set to automatically reboot using the default operating system 188 on the default partition 184. The MNS 190 can then communicate with the controller 132 to inform the controller that the repurposable computer experienced an error and needs to be repurposed.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A system for repurposing a computing device, comprising:

at least one computing device to be repurposed, the computing device comprising a server in a pool of servers of various server types, where the servers provide their respective statuses to a management controller device, the computing device having a computer readable storage medium comprising a default partition and a target partition different from the default partition, the default partition having a default operating system and application software, the computing device configured to be capable of booting from either the default partition or the target partition, where only one partition's operating system executes at a time, the default partition being configured to transfer system images via a network from a system image library to the target partition, the default partition also being configured to configure settings in a system image transferred from the system image library to the target image, the default operating system persisting despite the system image being copied to the target partition; the system image library including a plurality of different system images, each system image comprising a full bootable image of a pre-configured operating system and accompanying pre-configured application software, at least one of which is different, respectively, from the operating system and application software of the default partition, and the system image library being configured to transfer the system images via the network to computing devices being purposed;

a management controller device, separate from the computing device and the other servers in the pool, receiving the statuses via the network and balancing the server types in the pool by using the statuses to determine that a particular server type is needed in the pool and selecting a system image from among system images in the image library based on the system image corresponding to the determined server type, and where the management controller device identifies the selected system image to the computing device and, via the network, cause the computing device to automatically:

transfer the selected system image from the system image library to the target partition while booted from the default partition and running the default operating system, configure settings of the transferred system image on the target partition, and boot from the target partition after the system image is transferred to the target partition and configured, the management controller configured for access via the network, wherein the transferred image is a different image than the system image on the default partition.

2. The system of claim 1 further comprising an image transfer engine that transfers the selected system image from the system image library to the target partition.

3. The system of claim 1, wherein the selected system image is comprised of at least one operating system and at least one application program.

4. The system of claim 3, wherein the at least one selected system image further comprises one or more program modules for generation of a unique security identifier.

5. The system of claim 1 further comprising an installation service installing on the target partition a second operating system and a second service communicating a second current status of the computing device to the management controller, where the second service runs only while the second operating system is running.

6. The system of claim 1, wherein the computer readable storage medium further comprises a recovery partition containing recovery tools.

7. The system of claim 1, wherein the computing device comprises at least two target partitions.

8. The system of claim 1, wherein the management controller device initiates booting from the default partition after the initiating booting from the target partition.

9. A method for repurposing a computing device connected to a computing network and including a computer readable storage medium comprising a default partition and a target partition, the computing device comprising a server in a pool of servers of various server types, where the servers provide their respective statuses to a management controller device, the method comprising:

installing a default operating system image on the default partition, the default operating system including a default operating system and one or more services that provide a status of the computing device to a controller, that transfer a system image via a network to the default partition, and that configure settings of the default image, where the service(s) runs while the default operating system is running and the computing device is booted from the default partition;

booting the computing device from the default partition having the default operating system image;

receiving indicia of a selected system image from a management controller device, the management controller device separate from the computing device and the other servers in the pool, the management controller device having selected the system image by receiving the statuses via the network and balancing the server types in the pool by using the statuses to determine that a particular server type is needed in the pool and then selecting the system image from among system images in a system image library based on the system image corresponding to the determined server type;

responsive to the indicia, installing, by the one or more service(s), the selected system image on the target partition of the computer readable storage medium, including transferring the identified system image, via the network, to the target partition of the computer readable storage medium, and configuring, by the one or more service(s), settings of the system image on the target partition; and when done installing the selected system image, booting the computing device from the target partition having the configured selected system image while maintaining the operating system of the default partition.

10. The method of claim 9, wherein installing the identified system image further comprises:

transferring to the target partition a second service for providing a status of the computing device to the controller device, where the second service runs only while a second operating system of the target partition is running.

11. The method of claim 9, wherein booting the computing device from the target partition further comprises:

running a startup program to setup the selected system image on the target partition; and booting the computing device from the target partition having the selected system image.

12. The method of claim 11, wherein booting the computing device from the target partition further comprises:
   generating a unique security identifier for the computing device; and
   assigning the unique security identifier to the computing device.

13. The method of claim 9, wherein the selected system image transferred to the target partition is comprised of at least one operating system, at least one application program.

14. A method for repurposing a computing device in a network, the computing device comprising a server in a pool of servers of various server types, where the servers provide their respective statuses to a management controller device, the computing device including a storage medium comprising a default partition and a target partition and running an existing system image on the target partition, where the default partition and the target partition are bootable partitions, the method comprising:
   booting the computing device from the default partition having a default operating system that executes upon the booting, the default partition including one or more service(s) for providing, via a network, a status of the computing device to a controller device where the service(s) runs while the default operating system is running, the service(s) receiving indicia of a selected system image from a management controller device, the management controller device separate from the computing device and the other servers in the pool, the management controller device having selected the system image by receiving the statuses via the network and balancing the server types in the pool by using the statuses to determine that a particular server type is needed in the pool and then selecting the system image from among system images in a system image library based on the system image corresponding to the determined server type, and the service(s) transferring the selected system image, via the network, to the target partition;
   storing the selected system image comprising a target operating system on the target partition and overwriting the existing target system image while maintaining the default operating system in the default partition, and configuring, by the service(s), settings of the new target operating system on the target partition; and
   booting the computing device from the target partition having the new and configured selected system image.

15. The method of claim 14, wherein booting from the target partition comprises:
   running a startup program to setup the new target system image on the target partition; and
   booting the computing device from the target partition to run the selected system image.

16. The method of claim 15, wherein booting from the target partition further comprises:
   generating a security identifier for the computing device; and
   assigning the security identifier to the computing device.

17. The method of claim 14, wherein the existing system image comprises at least one operating system and at least one application program.

18. The method of claim 14, wherein the selected system image further comprises at least one application program.

19. One or more computer readable media having executable instructions stored thereon for repurposing a computing device that includes a storage medium having a default partition and a target partition, the computing device comprising a server in a pool of servers of various server types, where the servers provide their respective statuses to a management controller device wherein the executable instructions, when executed, implement steps comprising:
   receiving indicia of a selected system image from a management controller device, the management controller device separate from the computing device and the other servers in the pool, the management controller device having selected the system image by receiving the statuses via the network and balancing the server types in the pool by using the statuses to determine that a particular server type is needed in the pool and selecting the system image from the image library that corresponds to the determined server type, and where the management controller device;
   booting the computing device from the default partition having a default operating system;
   installing a target system image on the target partition, including selecting a system image from a library of at least one system image and transferring the selected system image via a network to the target partition of the storage medium;
   storing on the target partition a service for providing a status of the computing device to the controller where the service runs only while a target operating system associated with the target system image is running; and
   booting the computing device from the target partition having the target system image while maintaining the default operating system of the default partition.

20. A method for repurposing a computing device including a storage medium comprising a default partition and a target partition, the computing device comprising a server in a pool of servers of various server types, where the servers provide their respective statuses to a management controller device, where the default partition and the target partition are bootable partitions, the method comprising:
   receiving indicia of a selected system image from a management controller device, the management controller device separate from the computing device and the other servers in the pool, the management controller device having selected the system image by receiving the statuses via the network and balancing the server types in the pool by using the statuses to determine that a particular server type is needed in the pool and selecting the system image from the image library that corresponds to the determined server type, and where the management controller device;
   booting the computing device from the default partition having a default operating system that executes upon booting the default partition and one or more service(s) executing when the default partition boots and providing, via a network, a status of the computing device when the default operating system is running, the service(s) also transferring the selected system image, via the network, to the target partition;
   installing, by the service(s), the selected system image onto the target partition, where the selected system image is obtained from a library of at least one system image and transferring, via the network, the selected system image to the target partition of the computer readable storage medium, and configuring, by the service(s) settings of the selected system image that take effect when the selected system image boots;
   storing on the target partition a second service, separate from the first service, the second service providing a status of the computing device to the controller device where the second service runs while a target operating system of the target system image is running; and booting the computing device from the selected system image.

21. The method of claim 20, wherein an image transfer engine performs transferring the selected system image to the target partition.

22. The method of claim 20, wherein booting the computing device from the target partition further comprises:

running a startup program to setup the selected system image on the target partition; and booting the computing device from the target partition having the selected system image.

23. The method of claim 22, wherein booting the computing device from the target partition further comprises:

generating a unique security identifier for the computing device; and assigning the unique security identifier to the computing device.

24. The method of claim 22, wherein the selected system image loaded on the target partition is comprised of at least the target operating system and at least one application program.

25. The method of claim 20, wherein controller device determined a need for repurposing based on overload of another of the server of the same server type as the computing device prior to the repurposing.

* * * * *

UNITED STATES PATENT AND TRADEMARK OFFICE
CERTIFICATE OF CORRECTION

| | | |
|---|---|---|
| PATENT NO. | : 7,668,938 B1 | Page 1 of 1 |
| APPLICATION NO. | : 09/713740 | |
| DATED | : February 23, 2010 | |
| INVENTOR(S) | : Thomas G. Phillips et al. | |

It is certified that error appears in the above-identified patent and that said Letters Patent is hereby corrected as shown below:

In column 13, line 65, in Claim 4, after "the" delete "at least one".

In column 16, line 3, in Claim 19, delete "device" and insert -- device, --, therefor.

Signed and Sealed this
Eighth Day of February, 2011

David J. Kappos
*Director of the United States Patent and Trademark Office*